Oct. 16, 1928.

D. E. BRANSON 1,687,489

APPARATUS AND METHOD FOR ELECTRICAL TRANSMISSION OF PICTURES

Filed Dec. 15, 1923

INVENTOR
D. E. Branson
BY
ATTORNEY

Patented Oct. 16, 1928.

1,687,489

UNITED STATES PATENT OFFICE.

DAVID E. BRANSON, OF BLOOMFIELD, NEW JERSEY, ASSIGNOR TO AMERICAN TELEPHONE AND TELEGRAPH COMPANY, A CORPORATION OF NEW YORK.

APPARATUS AND METHOD FOR ELECTRICAL TRANSMISSION OF PICTURES.

Application filed December 15, 1923. Serial No. 681,004.

The principal object of my invention is to provide a new and improved method and apparatus for generating and transmitting a current for producing an image of a picture of other object. Another object of my invention is to produce a carrier wave for transmitting an image current by mechanical interruption of the light at the sending station. These and various other objects of my invention will become apparent on consideration of the embodiment thereof which I have chosen to illustrate and describe in this specification. It will be understood that the following description relates to this specific example and that the invention will be defined in the appended claims.

Figure 1:
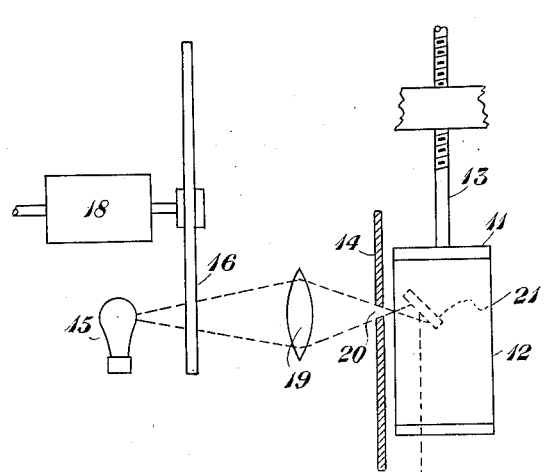
Figure 2:
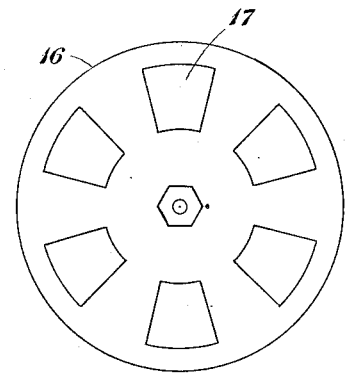
Figure 3:
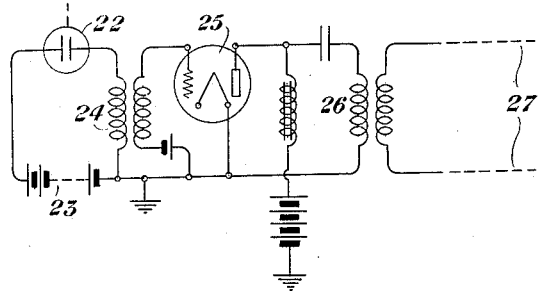
Figure 3:
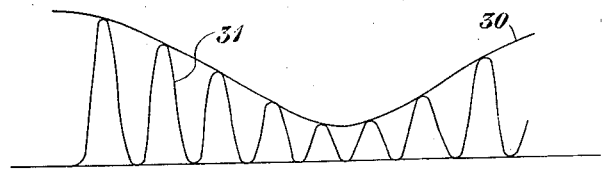

Referring to the drawings, Figure 1 is a diagram illustrating picture sending apparatus that can be employed to practice my invention, Fig. 2 is an elevation of a detail, and Fig. 3 is a curve diagram to be referred to in explaining the principle of the invention.

The glass drum 11 on the shaft 13 has wrapped around it a transparent picture film 12. This drum 11 carrying the film 12 is rotated uniformly and is also traversed in the direction of its axis with a comparatively slow speed so that relatively to the film 12 the orifice 20 in the screen 14 describes a helical course on the cylindrical film 12.

The light source 15 sends rays of light through the lens 19 and the orifice 20 and through the underlying spot of the film 12 to the oblique mirror 21, supported inside the drum 11. This mirror 21 reflects the light and directs it on a photoelectric cell 22.

It will readily be seen that as the light and dark regions of the film 12 corresponding to the lights and shades of the picture pass under the orifice 20, the quantity of light thrown on the cell 22 will vary accordingly.

The disc 16 rotated rapidly by a motor 18 has a series of holes 17, shown in Fig. 2. The disc 16 turns rapidly compared to the rotation of the drum 11 so that the light from the lamp 15 is interrupted many times during an ordinary transition from light to shade, or vice versa, for the part of the film 12 rotating under the opening 20. Thus, if the curve 30 in Fig. 3 gives the changing values for the light transmitted by the film 12 on the assumption that the disc 16 is out of the way, then the curve 31 will give the light transmitted to the cell 22 with the disc in normal operation.

The photoelectric cell 22 governs the current from the battery 23 according to well known principles, so that with much light the current rises and with little light it falls. Therefore, the current through the primary winding of the transformer 24 will vary somewhat in accordance with the curve 31 in Fig. 3.

This varying current in the primary of the transformer 24 will establish an alternating electromotive force on the grid of the audion amplifier 25, which will accordingly give an amplified alternating current output of amplitude corresponding to the amplitudes in Fig. 3. By means of the transformer 26 this modulated alternating current will be put on the line 27 and transmitted to the receiving station, where by well known means it may be applied to reproduce the picture.

The transmitted current is a modulated carrier current; the frequency of the carrier being the frequency with which the holes 17 in the disc 16 pass before the light source 15. This carrier current is modulated, that is, it has its amplitude varied in accordance with the intensity of the lights and shades of the film 12.

Synchronizing apparatus and suitable receiving apparatus of well known kinds may be employed in connection with the transmitting apparatus disclosed herein.

I claim:—

1. An electro-optical image producing system comprising a source of light for illuminating a picture or object an image of which is to be produced, means positioned intermediate said picture or object and said source of light for alternately transmitting and suppressing light from said source so as to interrupt the illumination of said picture or object, means for directing said light on to successive elemental areas in order of said picture or object, means for generating unidirectional current varying in amplitude in accordance with the intensity of the light received from the elemental areas of the picture or object, means for changing said unidirectional current into alternating current, and a transmission channel including an alternating current amplifying element for transmitting said alternating current to a distant station for controlling the production of an image of said picture or object.

2. An electro-optical image producing system comprising a source of intense light for illuminating a picture an image of which is to be produced, a revolving shutter having opaque and translucent portions of substantially equal size in a circumferential direction and positioned intermediate said source of light and said picture for alternately transmitting and suppressing light from said source, so as to interrupt the illumination of the picture, means for directing said light on to successive elemental areas of a picture film, a photo-electric cell for generating uni-directional current varying in amplitude in accordance with light transmitted through elemental areas of said picture film, means for changing said uni-directional current into alternating current, and a vacuum tube amplifier on which said alternating current is impressed for increasing the amplitude thereof.

In testimony whereof, I have signed my name to this specification this 13th day of December, 1923.

DAVID E. BRANSON.